United States Patent Office 3,635,873
Patented Jan. 18, 1972

3,635,873
CEMENT/POLYTHIOL POLYMER SEALANTS
Eugene R. Bertozzi, Yardley, Pa., assignor to Thiokol Chemical Corporation, Bristol, Pa.
No Drawing. Filed Dec. 20, 1968, Ser. No. 785,808
Int. Cl. C08g 51/04, 51/30
U.S. Cl. 260—33.8 R    14 Claims

ABSTRACT OF THE DISCLOSURE

Low cost, non-sagging, package-stable sealant and caulking compositions containing 250–900 parts by weight of a filler consisting of about 50 to 100% of a finely divided, alkaline, hydraulic cement and preferably in addition, about 150 and 350 parts by weight of a non-volatile, liquid diluent per 100 parts by weight of liquid polythiol polymer. The compositions are extremely stable when protected from moisture and oxygen but cure slowly upon exposure to air without the use of an added curing agent to form non-brittle cured products which adhere to various substrates without shrinkage. The tack-free time of the compositions may be shortened by the inclusion of small amounts of calcium hydroxide, ethylene glycol, glycerine or naphthenate driers. Small amounts of titanium dioxide contribute non-staining properties.

BACKGROUND OF THE INVENTION

Curable sealant and caulking compositions containing polythiol polymers, particularly polysulfide polythiol polymers, and oxidative curing agents are well-known in the building and automotive industries for use in joints having a considerable amount of movement. These high-quality, elastomeric compositions, which usually contain about 100 parts of polymer and about 20 to 100 parts of fillers, such as carbon blacks, titanium dioxide, calcium carbonate, silica etc., are relatively expense because of their high polymer content and the special curing agents required. These sealants also have a relatively short work life which is sometimes a disadvantage. They are used in both one- and two-package systems depending upon the curing agent used.

Solid polysulfide polymers which are, however, not polythiols, have been used in non-curable putties which usually contain about 800 to 1200 parts by weight of filler and 400 to 1,000 parts by weight of plasticizer per 100 parts of polysulfide polymer. These putties have the disadvantage of being rather difficult to mix because of the high viscosity of the polysulfide rubber. These putties also have a tendency toward more cold flow and obnoxious odors than the cured sealant formulations based on liquid polysulfide polymers mentioned above. They cannot be used where there is excessive joint movement.

Solid polysulfide polymers have also been included or formed in situ as components of hydraulic cement compositions used as mortars. These compositions are mixed with water before use and cure within a few minutes to a few hours to a hard, relatively brittle state suitable only for rigid joints. The polysulfide polymers are present in amounts of about .1–15% by weight of the cement. Examples of these mortars are described in U.S. Pats. 2,962,- 467 and 3,198,644.

SUMMARY OF THE INVENTION

The sealant and caulking compositions of the present invention contain liquid polythiol polymers which are filled with high proportions of cement which apparently and surprisingly catalyzes the air oxidation of the thiol groups to disulfide groups, thereby eliminating the need of an added curing agent. These compositions overcome some of the disadvantages of each of the previously mentioned prior art compositions.

Thus the main object of the present invention is to provide inexpensive, package-stable elastomeric sealant and caulking compositions which are particularly suitable for applications where there is no excessive joint movement.

Another object of the present invention is to provide sealant and caulking compositions which are slow curing but also non-sagging and non-shrinking and relatively free from obnoxious odors.

Still another object of the present invention is to provide sealant and caulking compositions with components which are relatively easy to mix together.

The compositions of the present invention have shown good adhesion to substrates such as glass, ceramic tile, metal, wood, and concrete during a period of over a year and a half, even when exposed to the weather, without showing any signs of loss of adhesion. Although a complete cure takes several months, the surface cures within a few days. If desired, the tack-free time of the composition may be shortened by the use of certain additives such as calcium hydroxide, ethylene glycol, glycerine or naphthenate driers. A small amount of titanium dioxide contributes non-staining properties to the compositions.

DESCRIPTION OF THE PREFERRED EMBODIMENTS

The sealant and caulking compositions of the present invention contain two essential ingredient, namely a liquid polythiol polymer, and an hydraulic cement. For added economy and ease of processability, the compositions should preferably contain a non-volatile liquid diluent. These ingredients are described in more detail below. In addition, the composition may include, per 100 parts of polymer, 10–20 parts by weight of naphthenate metal driers, such as zinc, cobalt, or iron naphthenates; 10–50 parts by weight of ethylene glycol or glycerine; or 50 to 150 parts by weight of calcium hydroxide to speed-up the tack-free time. Care must be exercised, however, since these compounds tend to cause the formation of a surface skin on the stored compositions and in larger amounts can produce a complete cure if the packages are not sufficiently protected from moisture and oxygen. Larger amounts of the glycols also cause undue hardness in the cured compositions. If colors are desired, pigments may be added to the white or light gray compositions. Titanium dioxide is a particularly valuable pigment for added whiteness and non-staining properties.

Polymer

Liquid polythiol polymers of various types are known in the prior art, of which the following are typical and may be used in the practice of the invention:

(1) Liquid polyalkylene polysufide polythiol polymers prepared as described in U.S. Pat. 2,466,963 and which have a molecular weight of the order of 500 to 25,000 and which are viscous liquids having viscosities within the range of 300 to 100,000 centipoises at 25° C. The commercially important liquid polymers of this type are particularly described in articles by Fettes and Jorczak, published in "Industrial and Engineering Chemistry," vol. 42, p. 2217 (1950), and vol. 43, p. 324 (1951). They are generally prepared from bis-beta-chloroethyl formal and are essentially composed of recurring $$-(SCH_2CH_2OCH_2OCH_2CH_2S)-$$

groups and have free mercapto terminals through which they may be cured to form a solid elastomer. In the manufacture of these commercial polymers, a small percentage of trichloropropane is commonly mixed with the bis-beta-chloroethyl formal to provide a slightly crosslinked structure upon cure. Particularly commercially valuable polymers include those having preferably recurring groups, such as bis(ethyleneoxy)methane, bis (butyleneoxy)methane, bis(ethylene)oxy, and bis(butylene)oxy and an average molecular weight of approximately 2,000 to 10,000 and preferably 3,500 to 8,000.

(2) Liquid —SSH terminated high rank polyalkylene polysulfide polymers prepared as described in U.S. Pat. 3,331,818 by reacting the conventional liquid polysulfide polymers of U.S. Pat. 2,466,963 as described above with elemental sulfur. The resulting products have a sulfur rank of about 1.6 to 5.0 and preferably about 2.5 to 3.5 and at least some sulfur linkages which contain more than two sulfur atoms. They may be cured upon exposure to the atmosphere or more rapidly by using the curing agents listed in said patent to form solid elastomers having greater solvent resistance than the conventional low rank cured polysulfide polymers described under (1).

(3) Liquid polyether polythiol polymers such as —SH terminated polypropylene glycol as disclosed in U.S. Pat. 3,258,495.

(4) Liquid hydrocarbon polythiol polymers such as —SH terminated polybutadiene (Chem. & Eng. News Apr. 4, 1966, page 37), —SH terminated butadiene/acrylonitrile copolymers and the alkanepolythiol, aralkanepolythiol, and arenepolythiol polymers disclosed in U.S. Pats. 2,230,390; 2,436,137; and 3,243,411.

(5) Liquid polyurethane polythiol polymers such as disclosed in U.S. patent application S.N. 484,097 filed Aug. 31, 1965.

(6) Liquid poly(alkylene sulfide) polythiol polymers such as disclosed in U.S. Pats. 3,056,841 and 3,070,580.

(7) Other polythiol polymers disclosed in U.S. Pat. 3,413,265; U.S. patent application S.N. 484,118 (now abandoned); and U.S. patent application S.N. 484,122 both filed Aug. 31, 1965.

The liquid polysulfide polythiol polymers are preferred since they seem to impart superior non-sagging properties to the compositions without requiring an additional thixotropic agent.

Cement

The cement used in the compositions according to the present invention may be any finely divided alkaline hydraulic cement having a high surface area such as portland cement; LaFarge, a grappier derived from hydraulic lime; Roman cement, a cement made by heating clay and limestone; blast furnace slag cement; aluminous cement; and pozzolana cement. Portland cement, either gray or white, is the preferred cement primarily because of its low cost. The cement is used in amounts ranging from about 250 to 900, preferably about 500 to 800, parts by weight per 100 parts by weight of polymer. The higher proportions of cement produce putty-like compositions whereas the lower proportions of cement produce gunnable sealant compositions.

If desired, up to 50% by weight of the cement may be replaced by other fillers such as carbon black, calcium hydroxide, calcium carbonate, calcium sulfate, powdered cork, wood, flour, talc, clays, silica and titanium dioxide without impairing the desirable alkaline and thixotropic properties of the composition. However, compositions containing a large amount of these other fillers tend to be very thick and are only suitable for use as putties.

Titanium dioxide, in an amount of about 5 to 100, preferably about 10 to 50, parts by weight per 100 parts by weight of polymer, is a desirable additive to prevent bleeding or staining of the composition on the substrate. The higher proportions, say about 50 to 100 parts also provide white compositions which can be tinted to provide pastel colors where desirable.

If desired, a thixotropic agent such as Attagel 20, a hydrated magnesium aluminum silicate, may be added to improve the gunnability or reduce the cold flow of the composition. From 0.1 to 50 parts by weight of thixotropic agent per 100 parts by weight of polymer may be used.

Diluent

The diluents used in the compositions of the present invention should be non-volatile, preferably not readily hydrolyzable, liquids which are compatible with liquid polythiol polymers. Suitable examples of such diluents are high-boiling halogenated aromatic or aliphatic hydrocarbons, such as chlorinated biphenyl; halogenated aromatic ethers such as chlorinated biphenyl oxides or diphenyl ethers; polyaromatic hydrocarbons such as terphenyls and poly($\alpha$-methylstyrene); polyethers, such as tridecyl alcohol formal, mono- and dialkyl ethers of ethylene glycol and diethylene glycol, and acetals of monoalkyl ethers of ethylene glycol and diethylene glycol; coumarone-indene resins; coal tar; pine tar etc. The diluent is used in amounts ranging from about 150 to about 350, preferably about 200, parts by weight per 100 parts by weight of polymer.

It was discovered that if the diluent is omitted, the compositions must contain a much larger proportion of polymer in order to be workable e.g. about 400 parts by weight of polymer and 600 parts by weight of cement. Such compositions are more expensive and cure very slowly since more oxygen must be absorbed in order to cure the larger amount of polymer and since the composition as a whole is less permeable to water and oxygen because of the lower content of cement. The porosity and high surface area of the cement is an important factor in obtaining practical compositions according to this invention.

Since the sealant and caulking compositions of the present invention contain no curing agents, they are extremely stable when stored in closed containers from which oxygen and moisture are excluded. Samples stored in this way have remained stable for over a year. It is believed that the porosity and high surface area of the cement not only facilitate the absorption of water and oxygen from the air but also catalyze the air oxidation or curing of the thiol groups of the polymer to disulfide bonds. The alkaline environment necessary for this oxidation is provided by the interaction of the cement and moisture from the air. The complete cure is slow and may take several months to complete. However, a surface skin is obtained within a relatively short time e.g. 1 to 10 days. If the uncured compositions are exposed to a large amount of water e.g. by submersion or by a heavy rainfall, they become noticeably harder although still not brittle. This hardness can be prevented to a certain extent by the inclusion of some calcium hydroxide or calcium carbonate in the formulation.

The mixing of small amounts of the compositions of the present invention can be done by hand with a spatula on a porcelain plate. Larger batches may be made in any suitable mixer, such as used in sealant or putty manufacture. Since the compositions are slow curing, only moderate precautions need be taken to protect them from undue exposure to air and moisture during mixing and packaging, unless they contain one of the materials previously mentioned for decreasing the tack-free time.

The following examples are representative of the compositions of the present invention.

TABLE I.—VARIATION IN FILLERS AND DILUENTS

| Example Number | 1 | 2 | 3 | 4 | 5 | 6 | 7 | 8 | 9 | 10 |
|---|---|---|---|---|---|---|---|---|---|---|
| Polymer A | 100 | 100 | 100 | 125 | 125 | 100 | 100 | 100 | 100 | 400 |
| Aroclor 1254 | 200 | 200 | 200 | 250 | 250 | 200 | 200 | 200 | | |
| White portland cement | 500 | 250 | 250 | 625 | 625 | | 250 | 250 | 500 | 600 |
| Calcium hydroxide | | 125 | | 50 | | | | | | |
| Calcium carbonate | | | 250 | | | | | | | |
| Calcium sulfate | | | | | 50 | | | 250 | | |
| Gray portland cement | | | | | | 500 | | | | |
| Talc | | | | | | | 250 | | | |
| TP-90B | | | | | | | | | 100 | |
| Bead skinning time, @ R.T. (days) | NS (14) | SNT (4) | SWT (9) | SWT (4) | SWT (7) | SWT (4) | NS (7) | NS (7) | SNT (5) | NS (14) |
| Bead skinning time, outdoors (days) | SWT (4) | | | | | | SWT (6) | SNT (6) | | SWT (4) |
| Remarks | (b) | (a) | (b) | (b) | (b) | (b) | (b) | (c) | (b) | (b) | a Extremely thick, had to be kneaded by hand.
b Good gunnable consistency.
c Putty-like consistency.
NOTE.—NS=no skin; SNT=skin, no tack; SWT=skin, with tack.

Polymer A is a liquid polythiol polysulfide polymer having an average molecular weight of 4,000 and an average structure $$HS(C_2H_4OCH_2OC_2H_4SS)_{23}C_2H_4OCH_2OC_2H_4SH$$

with a 0.5% crosslinking.

Aroclor 1254 is a high boiling chlorinated biphenyl.

TP-90B is the formal of diethylene glycol monobutyl ether.

Beads of the above formulations mixed on a porcelain plate were laid on concrete blocks and allowed to stand in a vertical position at room temperature for the number of days specified and then exposed to outdoor conditions for the remaining days specified. The beads showed no evidence of sagging. After several months, the cure had progressed inwardly and the compositions were still elastomeric and not brittle. The adhesion was still good.

TABLE II.—VARIATION IN POLYMERS

| Example Number | 11 | 12 | 13 | 14 | 15 |
|---|---|---|---|---|---|
| Polymer B | 100 | | | | |
| Polymer C | | 100 | | | |
| Polymer D | | | 100 | | |
| Polymer E | | | | 100 | |
| Polymer F | | | | | 100 |
| Aroclor 1254 | 200 | 200 | 200 | 200 | 200 |
| White portland cement | 600 | 600 | 600 | 500 | 500 |
| Attagel 20 | 40 | 40 | 40 | | |
| Bead skinning time, (days @ R.T.) | 6 | 6 | 2 | 2 | (*) |

*No skin or curing after 4 weeks.

The polymer, cement, and diluent were mixed together on a porcelain plate. Beads were laid on cement blocks. The compositions containing Polymer B, C, and D had too much cold flow. On the following day, the Attagel 20 was added to the previously compounded mixtures which had been stored in screw cap jars. The Attagel 20 eliminated the cold flow problem.

The polymers used in the above examples are identified as follows:

Polymer B—a polypropylene glycol polymer containing urethane groups and having a molecular weight of 2,000–3,000 and an —SH content of 2.3%.

Polymer C—a polyether containing aromatic groups and having a molecular weight of about 4,780 and an —SH content of 1.38%.

Polymer D—a polyether having the structure $$R[O(C_3H_6O)_nCH_2-\overset{OH}{\underset{|}{C}H}-CH_2SH]_m$$

where R is alkyl, n=20-25, and m=2-3; a molecular weight of about 5,000 and an —SH content of 1.28%.

Polymer E—a high rank polysulfide polymer having an average structure $$HSS(C_2H_4OCH_2OC_2H_4S_x)_nC_2H_4OCH_2OC_2H_4SSH$$

with a 2% crosslinking, where x has an average value of 3.5 and n has an average value of 10 to 30.

Polymer F—a high rank polysulfide polymer with the same structure as Polymer E and having the —SSH terminals blocked with formaldehyde.

Example 15 indicates the necessity of having freely available oxidizable terminals in order to provide the air-curable compositions of the present invention.

TABLE III.—THIXOTROPIC AGENTS

| Example Number | 16 | 17 | 18 | 19 |
|---|---|---|---|---|
| Polymer A | 100 | 100 | 100 | 100 |
| Aroclor 1254 | 250 | 250 | 250 | 250 |
| White portland cement | 600 | 600 | 600 | 600 |
| Titanium dioxide | 5 | 5 | 48 | 48 |
| Attagel 20 | | 4 | | 38 |

Remarks

Example 16—Compounded easily—light gray appearance. Could be slightly more thixotropic. Bead skinned over in 4 days outside. Material package-stable.

Example 17—Compounded easily—light gray appearance. Good thixotropic properties. Bead skinned over in 4 days outside. Material package-stable.

Example 18—Compounded easily—white in appearance. Good thixotropic properties. Bead skinned in 4 days outside. Material package-stable.

Example 19—Difficult compounding—white in appearance. Compound too viscous (putty-like). Bead was partially cured when prepared.

TABLE IV.—TACK-FREE TIME ACCELERATORS

| Example Number | 20 | 21 | 22 | 23 | 24 | 25 | 26 | 27 | 28 | 29 | 30 | 31 |
|---|---|---|---|---|---|---|---|---|---|---|---|---|
| Polymer A | 125 | 100 | 100 | 100 | 100 | 95 | 95 | 95 | 95 | 95 | 400 | 400. |
| Aroclor 1254 | 250 | 200 | 200 | 200 | 200 | 238 | 238 | 238 | 238 | 238 | | |
| White portland cement | 625 | 600 | 600 | 600 | 600 | 540 | 540 | 540 | 540 | 540 | 600 | 600. |
| Ethylene glycol | 10 | 5 | | 5 | 1 | | | | | | | |
| Glycerine (95%) | | | 5 | | | | | | | | | |
| Zinc naphthenate | | | | | | 20 | 10 | 15 | 15 | 20 | 20 | 15. |
| Bead skinning time @ R.T. | SNT 1 day | SNT 2 hrs. | SWT 1 day | SWT 2 | SWT 1 day | SWT 4 days | SWT 1 hr. | SWT 1 hr. | SWT 1 hr. | SWT 4 days | SWT 4 days | NS. 4 days. |
| | | (a) | (a) | (b c) | (c) | (d) | (e) | (f) | (b g) | (b h) | (b) | (b). | a The ethylene glycol (or glycerine) was mixed in with part of the cement.
b Prepared under nitrogen.
c The ethylene glycol was mixed in with the Aroclor.
d Partially cured when compounded.
e Sample stored in jar was still uncured at the end of 5 days. Bead had partly flowed off block.
f Jar sample was uncured but cheesy after 1 week.
g Jar sample was uncured but grainy after 1 week.
h Jar sample was uncured but grainy after 1 day.

The zinc naphthenate used was an 8% solution in naphtha.

The formulations were mixed on a porcelain plate and beads were laid on concrete blocks which were placed in a vertical position.

What is claimed is:

1. A package-stable, air-curable sealant and caulking composition which comprises a substantially anhydrous mixture of 100 parts by weight of one or more liquid polythiol polymers having a molecular weight of about 500 to 25,000 and about 150 to 900 parts by weight of filler, about 50 to 100% of which consists of a finely divided, alkaline, hydraulic cement, wherein said composition comprises no added curing agent for the liquid polythiol polymers.

2. A composition as in claim 1 in which the cement is portland cement.

3. A composition as in claim 2 which contains in addition about 150 to about 350 parts by weight of a nonvolatile, not readily hydrolyzable liquid diluent which is compatible with said polythiol polymer.

4. A composition as in claim 3 in which the polythiol polymer is selected from the group consisting of polyalkylene polysulfide polythiol polymers, —SSH terminated high rank polyalkylene polysulfide polymers, polyether polythiol polymers, hydrocarbon polythiol polymers, polyurethane polythiol polymers and poly(alkylene sulfide) polythiol polymers.

5. A composition as in claim 4 which contains in addition a minor amount of a tack-free time accelerator selected from the group consisting of ethylene glycol, glycerine, and metal naphthenate driers.

6. A composition as in claim 4 which contains in addition from about 0.1 to 50 parts by weight of a thixotropic agent.

7. A composition as in claim 4 wherein the polythiol polymer is a polyalkylene polysulfide polythiol polymer.

8. A composition as in claim 7 wherein the diluent is a chlorinated biphenyl.

9. A composition as in claim 4 in which up to 50% by weight of the filler is selected from the group consisting of carbon black, calcium hydroxide, calcium carbonate, calcium sulfate, powdered cork, wood flour, talc, clays, silica and titanium dioxide.

10. A composition as in claim 9 which contains from about 10 to about 50 parts by weight of titanium dioxide.

11. A composition as in claim 10 in which the polymer is a polyalkylene polysulfide polythiol polymer.

12. A composition as in claim 4 which contains about 200 to about 250 parts by weight of diluent and about 500 to about 800 parts by weight of cement.

13. A composition as in claim 12 wherein the filler is 100% portland cement.

14. A composition as in claim 13 in which the polymer is a polyalkylene polysulfide polythiol polymer.

References Cited

UNITED STATES PATENTS

| | | | |
|---|---|---|---|
| 2,466,963 | 4/1949 | Patrick et al. | 260—79.1 |
| 3,198,644 | 8/1965 | Simonson | 106—93 |
| 3,240,736 | 3/1966 | Beckwith | 260—37 X |
| 3,247,138 | 4/1966 | Jorczak et al. | 260—37 X |

OTHER REFERENCES

Damusis, Adolfas, Sealants, Reinhold Pub. Corp., New York, 1967, pp. 179–181.

MORRIS LIEBMAN, Primary Examiner

J. H. DERRINGTON, Assistant Examiner

U.S. Cl. X.R.

260—28 R, 33.2 R, 33.6 R, 37 R